United States Patent
Allmandinger et al.

(10) Patent No.: US 12,403,962 B2
(45) Date of Patent: Sep. 2, 2025

(54) AERODYNAMIC DEVICE CONTROL

(71) Applicant: Ford Global Technologies, LLC, Dearborn, MI (US)

(72) Inventors: Alex Allmandinger, Ferndale, MI (US); Robert Walsh, Novi, MI (US); Michael Bastanipour, Ferndale, MI (US); Sriram Pakkam, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 598 days.

(21) Appl. No.: 17/320,590

(22) Filed: May 14, 2021

(65) Prior Publication Data

US 2022/0363322 A1   Nov. 17, 2022

(51) Int. Cl.
| | | |
|---|---|---|
| *B62D 35/00* | (2006.01) | |
| *G01C 21/20* | (2006.01) | |
| *G06N 5/04* | (2023.01) | |
| *G06N 20/00* | (2019.01) | |

(52) U.S. Cl.
CPC .......... *B62D 35/00* (2013.01); *G01C 21/20* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,006,901 B2 | 2/2006 | Wang | |
| 9,924,404 B1* | 3/2018 | Salour | H04L 65/80 |
| 10,065,688 B2 | 9/2018 | Heil et al. | |
| 10,427,730 B2 | 10/2019 | Williams et al. | |
| 2009/0224108 A1* | 9/2009 | Lutke | B64C 3/46 |
| | | | 244/219 |
| 2013/0226414 A1* | 8/2013 | De Luca | B62D 37/02 |
| | | | 701/49 |
| 2014/0288765 A1* | 9/2014 | Elwart | G01C 21/3837 |
| | | | 701/32.4 |
| 2016/0355219 A1* | 12/2016 | Cooper | B62D 35/007 |
| 2017/0043644 A1* | 2/2017 | Mosher | B60G 99/006 |
| 2017/0088106 A1* | 3/2017 | Fahland | B60T 8/1766 |
| 2017/0088194 A1* | 3/2017 | Heil | B62D 35/00 |
| 2017/0158262 A1* | 6/2017 | Shami | G05D 3/00 |

(Continued)

*Primary Examiner* — James J Lee
*Assistant Examiner* — Melanie G Huber
(74) *Attorney, Agent, or Firm* — Burr & Forman; Lorne Forsythe

(57) ABSTRACT

An aerodynamics control system for a vehicle may include a repositionable aerodynamic device disposed at a portion of the vehicle, a controller operably coupled to components or sensors of the vehicle to receive information including vehicle performance data and position information for the aerodynamic device, and a vehicle location sensor determining location information for the vehicle. The controller stores the vehicle performance data and the position information in association with the location information for each of a plurality of locations. Responsive to detecting an approach of the vehicle to one of the locations, the controller provides a control instruction to position the aerodynamic device based on recorded vehicle performance data and recorded position information associated with the one of the locations.

18 Claims, 5 Drawing Sheets

(56) References Cited

U.S. PATENT DOCUMENTS

| | | | |
|---|---|---|---|
| 2017/0371337 A1* | 12/2017 | Ramasamy | G08G 1/056 |
| 2019/0002039 A1* | 1/2019 | Cha | G01S 19/42 |
| 2020/0108835 A1* | 4/2020 | Suzuki | G07C 5/008 |
| 2020/0307344 A1* | 10/2020 | Hille | B60G 17/01908 |
| 2020/0377158 A1 | 12/2020 | Cunningham et al. | |
| 2021/0253087 A1* | 8/2021 | Titus | B62D 35/007 |
| 2022/0032957 A1* | 2/2022 | Wulfe | G01C 21/3407 |

* cited by examiner

AERODYNAMIC DEVICE CONTROL

TECHNICAL FIELD

Example embodiments generally relate to vehicle aerodynamics and, more particularly, relate to controllable aerodynamic devices for which the control is based on situational awareness.

BACKGROUND

Vehicles, and especially high performance vehicles, often employ aerodynamic devices that are designed to improve aerodynamic performance. These aerodynamic devices are typically static. The static positioning of aerodynamic devices provides increased downforce (decreasing lift) during turns, which generally improves handling and stability. Additionally, setting aerodynamic balance (i.e., the location of the center of pressures or centroid of the aerodynamic force) is also generally limited to being adjusted before driving. However, the optimal aerodynamic balance is different for different cornering radii, vehicle weight, and road conditions.

Because aerodynamic devices are typically static, they may provide improved performance over only a limited set of vehicle conditions. As such, these static aerodynamic devices may be designed to be set at positions that provide increases in average performance. Different positions may be employed, each statically positioned, and vehicle performance may be compared to provide the best average position to optimize vehicle performance.

Thus, it may be desirable to develop aerodynamic devices that addresses some of the shortcomings discussed above.

BRIEF SUMMARY OF SOME EXAMPLES

In accordance with an example embodiment, an aerodynamics control system for a vehicle may be provided. The aerodynamics control system may include a repositionable aerodynamic device disposed at a portion of the vehicle, a controller operably coupled to components or sensors of the vehicle to receive information including vehicle performance data and position information for the aerodynamic device, and a vehicle location sensor determining location information for the vehicle. The controller stores the vehicle performance data and the position information in association with the location information for each of a plurality of locations. Responsive to detecting an approach of the vehicle to one of the locations, the controller provides a control instruction to position the aerodynamic device based on recorded vehicle performance data and recorded position information associated with the one of the locations.

In another example embodiment, a method of providing vehicle stability control to a vehicle having an aerodynamic device disposed on the vehicle is provided. The method may include receiving status information and location information from components or a sensor network of the vehicle, determining whether the location information is a known location, recording the location information and status information as path data for a path segment corresponding to the location information, and classifying the path segment in response to the location information not being known. The method may also include controlling the aerodynamic device based on a selected control algorithm in response to the location information being known. The selected control algorithm may be selected based on a classification of the path segment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
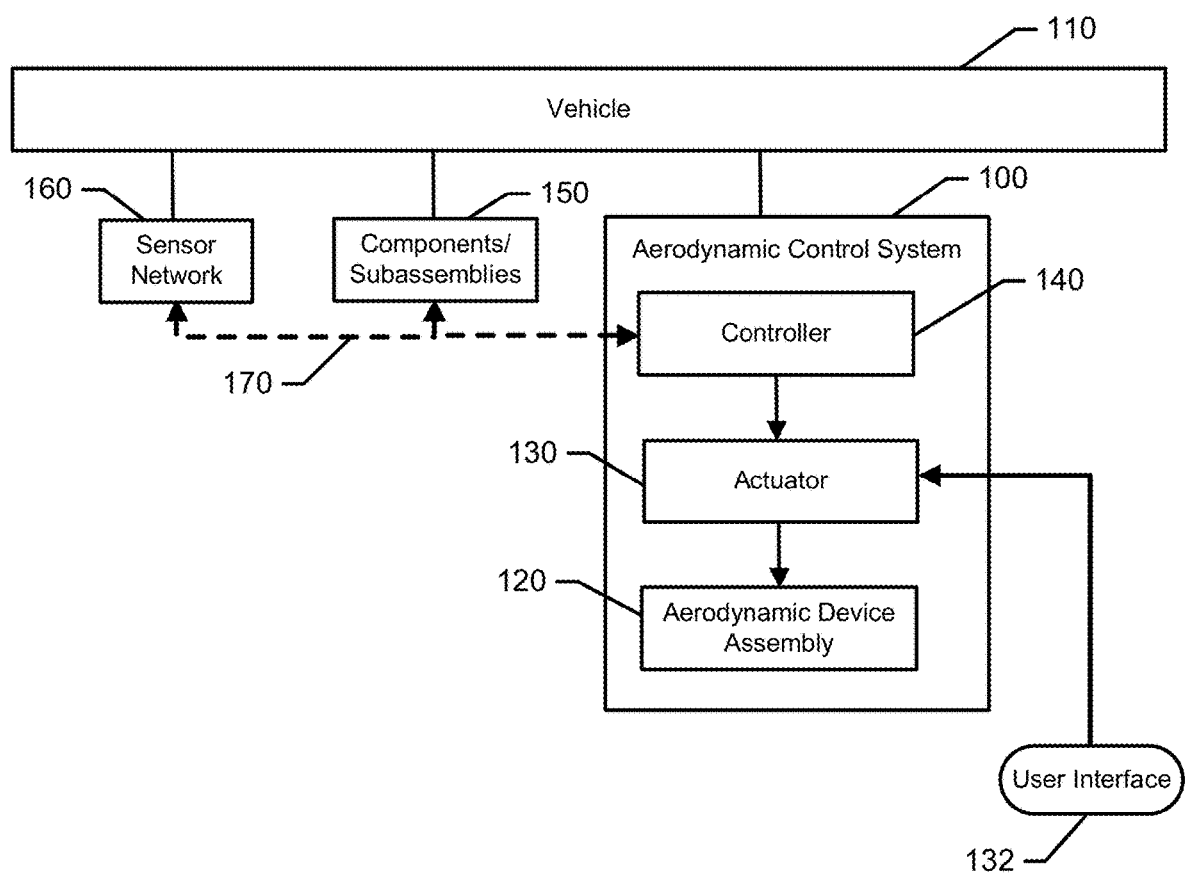
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some example embodiments may provide an improved system for aerodynamic control that includes an aerodynamic control module capable of being modified while driving to optimize drag, lift and other aerodynamic properties across various specific vehicle conditions. In some cases, the aerodynamic control module may utilize location information and other sensor information to appreciate current and/or future location so that active aerodynamic device positioning can be accomplished while driving. Moreover, in some cases, example embodiments may enable tuning (e.g., via machine learning) that occurs based on recognition of similar or the same conditions as those previously encountered, so that active changes may be made to optimize performance. Optimizing aerodynamic device positions for instantaneously determined conditions and situations can yield benefits in both customer confidence and vehicle capability with less compromise. As a result, vehicle performance and driver satisfaction may also be improved.

FIG. 1 illustrates a block diagram of an aerodynamic control system 100 of an example embodiment. The components of the aerodynamic control system 100 may be incorporated into a vehicle 110 (e.g., via being operably coupled to a chassis of the vehicle 110 and/or electronic control systems of the vehicle 110). Of note, although the components of FIG. 1 may be connected to the chassis of the vehicle 110, it should be appreciated that such connection may be either direct or indirect. Moreover, some of the components of the aerodynamic control system 100 may be connected to the vehicle 110 via intermediate connections to other components either of the chassis or of other systems or components.

The aerodynamic control system 100 may include an aerodynamic device assembly 120 that may include one or more aerodynamic devices (e.g., a wing, strake, vent, airfoil, air guide, or the like) that are movable responsive to control initiated by the aerodynamic control system 100 while the vehicle 110 is in motion. In its simplest form, the aerodynamic device assembly 120 may include a single aerodynamic device (e.g., a rear wing) that can be repositioned to change the angle of attack of the device while driving, or to change the device between a deployed state and a retracted state. Changes between the deployed state and retracted state, as well as changes to the angle of attack, may all be considered to be state changes for the aerodynamic device assembly 120. The aerodynamic control system 100 may include programming and programmatically controlled physical structures that enable the initiation of changes to the state of the aerodynamic device assembly 120 based on various conditions or information pertaining to vehicle status, vehicle location, and based on driver or operator control or preferences.

The aerodynamic device assembly 120 of example embodiments may be dynamic and intelligently controlled. The "intelligently controlled" nature of the aerodynamic device assembly 120 refers to the fact that automatic adjustments are made to optimize the positioning of the aerodynamic device(s). The "dynamic" nature of the aerodynamic device assembly 120 refers to the fact that it is enabled to be dynamically repositioned responsive to real time conditions and status information to actively improve the performance of the vehicle 110. Thus, for example, when the operator has enabled automatic control of the aerodynamic device assembly 120 by selecting a mode in which the aerodynamic control system 100 is operable, the state of the aerodynamic device(s) may be controlled based on the current location and conditions experienced by the vehicle 110. Thus, for example, various changes in conditions or vehicle status may dynamically cause the state of the aerodynamic device(s) to be changed based on programmed rules or algorithms for control of the aerodynamic device assembly 120.

In an example embodiment, the aerodynamic control system 100 may include a repositioning assembly (e.g., actuator 130), which may be provided as part of the aerodynamic control system 100 in order to reposition or move the aerodynamic device assembly 120 under the control of a controller 140 (or control module) of the aerodynamic control system 100. In some cases, the controller 140 may be part of a vehicle dynamic module (VDM) or other control system of the vehicle 110 that is configured to perform other tasks related or not related to aerodynamic control or performance management. However, the controller 140 could be a dedicated or standalone controller in some cases. The operator (or driver) may disable or enable operation of the actuator 130 by using a user interface 132. For example, in one or more modes, the actuator 130 may be disabled, and in one or more other modes, the actuator 130 may be enabled to move under control of the controller 140. As an alternative to having the mode disable or enable the actuator 130 directly, the actuator 130 could be controlled indirectly via the controller 140. Thus, the user interface 132 may interact with the controller 140 instead of the actuator 130 in some cases. The user interface 132 may be internal or external relative to the vehicle 110. Thus, for example, when internal, the user interface 132 may include switches, levers, buttons, a mouse, touch screen display, or any other suitable human machine interface (HMI). Also as examples, when external, the user interface 132 may be an external control console, a smart phone, or other interface component that can wirelessly communicate with the vehicle 110.

In an example embodiment, the controller 140 may receive information that is used to determine vehicle status (or environmental conditions) and vehicle location from or associated with various components or subassemblies 150 of the vehicle 100. Additionally or alternatively, various sensors that may be operably coupled to the components or subassemblies 150 may be included, and may provide input to the controller 140 that is used in determining vehicle status and location. Such sensors may be part of a sensor network 160 and sensors of the sensor network 160 may be operably coupled to the controller 140 (and/or the components or subassemblies 150) via a vehicle communication bus (e.g., a controller area network (CAN) bus) 170.

The components or subassemblies 150 may include, for example, a brake assembly and/or a wheel assembly of the vehicle 110. Sensors associated with the brake assembly may provide inputs such as brake pedal position, or brake pressure, to the controller 140. Sensors associated with the wheel assembly may provide information about vehicle speed, wheel angle, etc. Other sensors of the sensor network 160 that may be operably coupled to the brake assembly, the wheel assembly or other parts of the vehicle 110 may provide information relating to brake torque, brake torque rate, vehicle acceleration, individual wheel speeds/angles, etc. Other examples of the components or subassemblies 150 and/or corresponding sensors of the sensor network 160 may provide information relating to pitch, yaw, pitch rate, yaw rate, lateral G force, throttle position, selector button positions associated with chassis and/or vehicle control selections, etc. Thus, for example, the sensors may include an inclinometer, gyroscope, accelerometer, and/or the like. In some cases, the sensor network 160 may further include sensors for detecting weather conditions, road conditions or the like. For example, moisture sensors and temperature sensors may detect wet or icy roads.

Road conditions can also be determined using cameras, microphones, rain sensors, and/or the like in some cases. Thus, for example, the sensor network 160 may also include one or more cameras that operate in the visible light spectrum, infrared cameras, Lidar, and/or the like to detect debris or other obstacles or road conditions. In some cases, however, the cameras may also detect location or position relative to a particular characteristic of the road ahead. For example, the cameras may detect a turn or a straightaway. Moreover, the cameras may detect a magnitude of the turn or length of the straightaway. In an example embodiment, the cameras may also be capable of comparing image data to previously captured images to determine if the location at which the vehicle 110 currently operates happens to also be a location at which the vehicle 110 had operated in the past. When location correlation occurs, comparisons between prior traversals of the location can be made to determine an optimal setting (or at least a setting to use) for the aerodynamic device assembly 120 at the location (either currently or in the near future). However, location could alternatively be determined using other means. For example, global positioning system (GPS) data or other location sensors could also or alternatively be employed.

Accordingly, for example, the controller 140 may be able to receive numerous different parameters, indications and other information that may be related to or indicative of different situations or conditions associated with vehicle status. The controller 140 may also receive information indicative of vehicle location. The controller 140 may then be configured to use the information received defining vehicle status and/or location in association with the execution of one or more control algorithms that may be used to provide instructions to the actuator 130 in order to control a state (or positions) of the aerodynamic device or devices of the aerodynamic device assembly 120.

Figure 2:
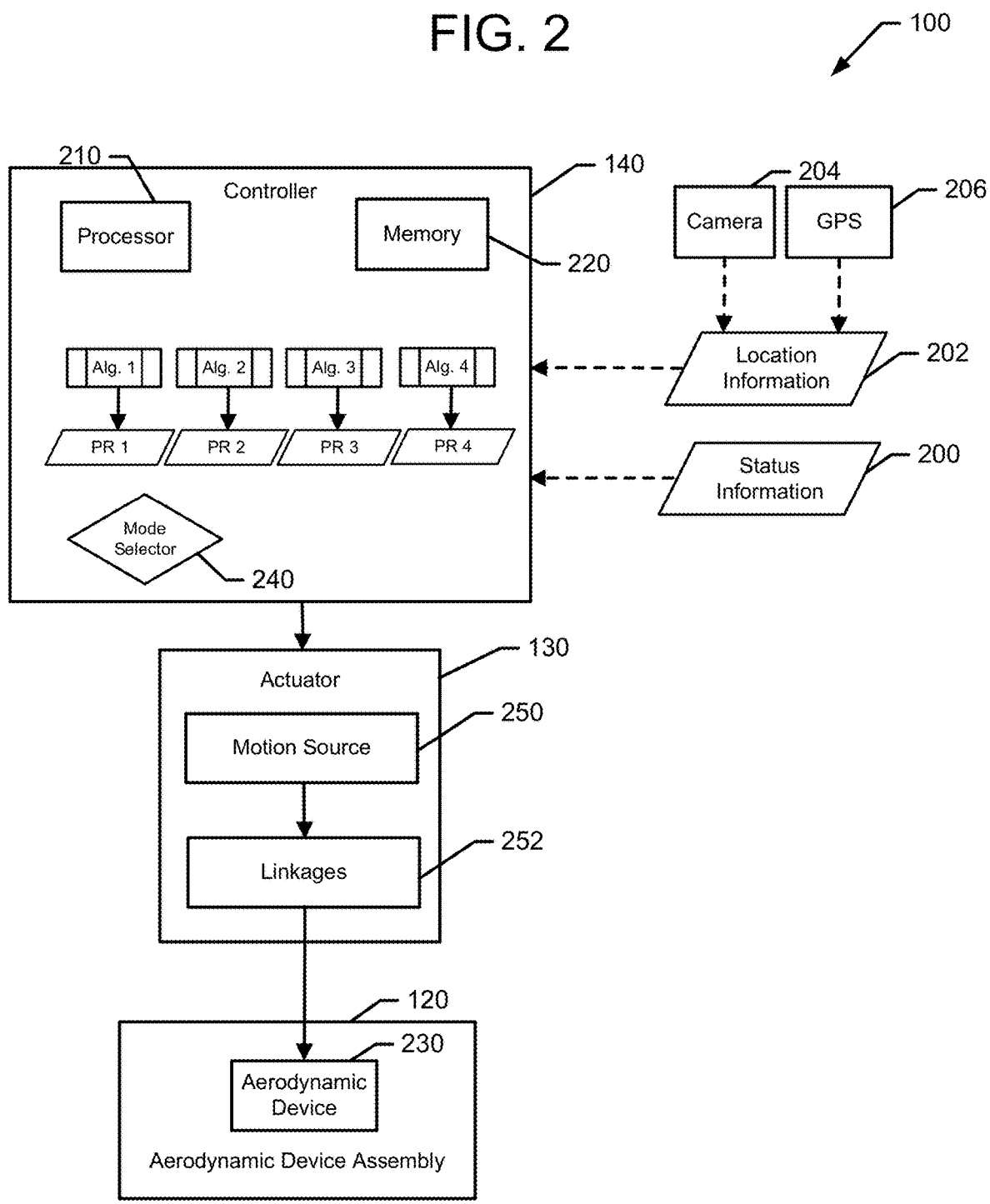
FIG. 2 illustrates a block diagram of some components of an aerodynamic control system of the vehicle control system of FIG. 1 in accordance with an example embodiment.

FIG. 2 illustrates a block diagram of various components of the aerodynamic control system 100 of one example embodiment in greater detail. In this regard, for example, the controller 140 may receive status information 200 (e.g., from the sensor network 160) via the vehicle communication bus 170. The status information 200 may include any or all of the types of information described above. The controller 140 may also or alternatively receive location information 202 from, for example, either or both of a camera 204 and a GPS device 206. Processing circuitry (e.g., a processor 210 and memory 220) at the controller 140 may process the status information 200 and the location information 202 by running one or more control algorithms. The control algorithms may include instructions that can be stored by the memory 220 for retrieval and execution by the processor 210. In some cases, the memory 220 may further store one or more tables (e.g., look up tables) and various calculations and/or applications may be executed using information in the tables, the status information 200 and/or the location information 202.

The processor 210 may be configured to execute the control algorithms in series or in parallel. However, in an example embodiment, the processor 210 may be configured to execute multiple control algorithms either based on prior selection or in parallel (e.g., simultaneously). In an example embodiment, each control algorithm (e.g., Alg. 1, Alg. 2, Alg. 3 and Alg. 4 in FIG. 2) may be associated with a different mode, situation, or set of conditions. Alternatively, each of the control algorithms may be associated with a different driving style or strategy that the driver can select based on preference. In any case, a selected one or each of the control algorithms may be executed to determine a corresponding position request (e.g., PR 1, PR 2, PR 3 and PR 4) that informs the actuator 130 where/how to position an aerodynamic device 230 (or devices) of the aerodynamic device assembly 120. The processor 210 may have a speed and processing power sufficient to ensure that the status information 200 and location information 202 received via the vehicle communication bus 170 are both received and processed in real time (or near real time) to cause corresponding changes to be made to the actuator 130.

In some cases, to select a mode of operation of the controller 140, which may influence or dictate which algorithm(s) to use, a mode selector 240 (e.g., a portion or component of user interface 132) may be provided. The mode selector 240 may have a first mode in which the controller 140 operates automatically as described herein (e.g., a track mode, or high performance mode) and a second mode in which the controller 140 does not operate to adjust positions of the aerodynamic device assembly 120. However, other modes are also possible.

In an example embodiment, as shown in FIG. 2, the actuator 130 may include a motion source 250 (e.g., an electric motor, a hydraulic actuator, a pneumatic actuator, or the like) that is operably coupled to linkages 252 that are in turn operably coupled to the aerodynamic device 230 (or devices) of the aerodynamic device assembly 120. Thus, for example, the linkages 252 may include mechanical structures (e.g., hinges, links, arms, rods, shape-changing materials, etc.) that operably couple motion from an output of the motion source 250 to the aerodynamic device 230 (or devices). In cases where the aerodynamic device 230 is a single rear wing, one or multiple instances of the motion source 250 and linkages 252 may be used to reposition the wing. In other cases in which multiple aerodynamic devices 230 are used (e.g., devices specific to individual wheels or corners of the vehicle 110), corresponding multiple motion sources 250 and linkages 252 (and perhaps also actuators 130) may be employed under the control of the controller 140.

Figure 3:
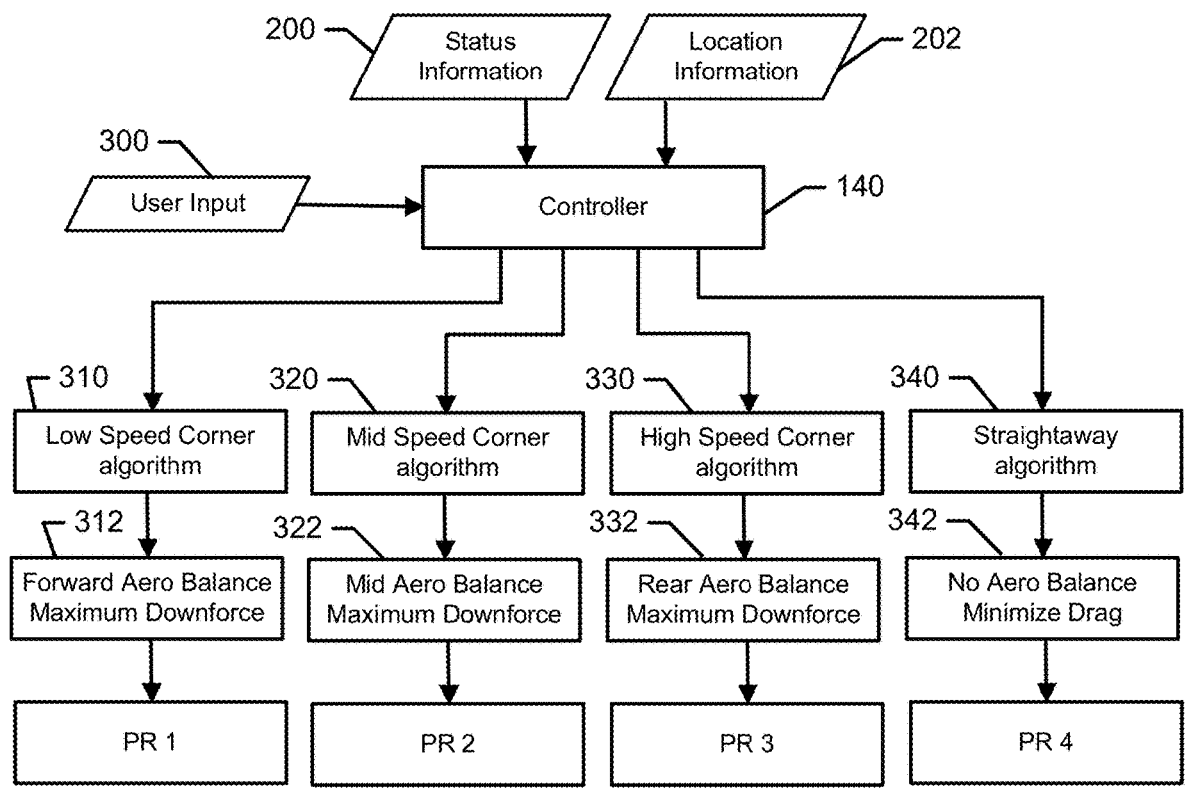
FIG. 3 illustrates a block diagram of how a controller may select control algorithms in accordance with an example embodiment.

As noted above, the controller 140 may execute one or multiple control algorithms at a time to control the aerodynamic device assembly 120 in a situationally aware manner. In some cases, each of the control algorithms (e.g., Alg. 1, Alg. 2, Alg. 3 and Alg. 4) may have an association with a different situation or scenario. FIG. 3 illustrates a block diagram of one example in which situationally specific control algorithms may be employed. In this regard, as shown in FIG. 3, the controller 140 may receive the location information 202, the status information 200, and/or user input 300. The user input 300 may be made via the selector 240, or any other suitable input device. The controller 140 may then perform calculations associated with the control algorithms which, in this example, include a low speed corner algorithm 310, a mid speed corner algorithm 320, a high speed corner algorithm 330 and a straightaway algorithm 340.

The status information 200 may, as noted above, be provided from sensors of the sensor network 160. Inputs such as sound information, moisture data, steering angle, vehicle speed, brake pressure, wheel speed, ride height, etc., from various components including corresponding microphones, rain sensors, accelerometers, pitot tubes, gyroscopes, suspension plots, and/or the like may be included among the status information 200. The controller 140 may receive the status information 200 and the location information 202 to infer, determine or confirm a segment classification, rating or characterization. In some cases, the use of video data from the camera 204 may be employed to confirm classifications, or to make determinations regarding future positions of the vehicle 110 (e.g., for upcoming corners or turns). The user input 300 may include tuning inputs (e.g., for setting weighting factors involved in each control algorithm), mode selections (e.g., aggressive/non-aggressive, loose/tight, etc. in terms of oversteer/understeer, steering/brake inputs, suspension, etc.) or otherwise enable the operator/driver to have an influence over the operation of the controller 140. The mode selections may be named for the control paradigm associated with each respective mode, or may be parts of other modes that have other characteristics as well such as the non-limiting examples of Track Mode, Sport Mode, Drift Mode, and/or the like.

In an example embodiment, the location information 202 may be GPS data or other information that enables the controller 140 to determine a specific location of the vehicle 110. For racing applications, the location information 202 may indicate a track position on a known track, or even a track that is being learned on the fly (e.g., by mapping and recording data for subsequent laps). Either using a known track, or by learning the geometries of the track on which the vehicle 110 is operating, the speed of the vehicle 110 and the magnitude of the various turns encountered at any given time may be used to determine how to characterize each portion of the track. Thus, for example, the controller 140 may monitor movement of the vehicle 110 around the track and determine a characterization, classification or rating for each segment or portion of the track. In one example, the segments may be determined to be either a high speed, low speed, or mid speed turn or corner, or a straightaway. However, other classifications of segments are also possible, and control algorithms may exist for each respective one of the classifications that are possible.

If a particular segment is characterized as a low speed corner, then the low speed corner algorithm 310 may be used by the controller 140 to determine how to control the aerodynamic device assembly 120 in the corresponding segment. If a particular segment is instead characterized as a mid speed corner, then the mid speed corner algorithm 330 may be used by the controller 140 to determine how to control the aerodynamic device assembly 120 in the corresponding segment. Likewise, if a particular segment is characterized or classified as either a high speed corner or a straightaway, then the high speed corner algorithm 330 or the straightaway algorithm 340, respectively, may be used by the controller 140 to determine how to control the aerodynamic device assembly 120 in the respective segment.

As shown in FIG. 3, the low speed corner algorithm 310 may favor a forward aero balance and maximum downforce strategy 312, which may be programmed as part of the low speed corner algorithm 310. This may translate into a command sequence or position request (i.e., PR1) to the actuator 130 for changing the aerodynamic device 230 of the aerodynamic device assembly 120 to achieve the balance desired to provide better turn in. This (and other algorithms) may, in some cases, operate by defining target parameters or positions for the aerodynamic device 230 and measuring error from such parameters/positions with continued effort to drive the error to a minimum value. Similarly, the mid speed corner algorithm 320 may favor a mid aero balance and maximum downforce strategy 322, which may be programmed as part of the mid speed corner algorithm 320. This may translate into a command sequence or position request (i.e., PR2) to the actuator 130 for changing the aerodynamic device 230 of the aerodynamic device assembly 120 to achieve the balance desired. For the high speed corner algorithm 330, a rear aero balance maximum downforce strategy 332 may be employed, which may translate into a command sequence or position request (i.e., PR3) to the actuator 130 for changing the aerodynamic device 230 of the aerodynamic device assembly 120 to achieve the balance desired and improved stability. Finally, for the straightaway algorithm 340, a minimum drag, no balance strategy 342 may be employed, which may translate into a command sequence or position request (i.e., PR4) to the actuator 130 for changing the aerodynamic device 230 of the aerodynamic device assembly 120 to achieve minimum drag.

As can be appreciated from the descriptions above, location information 202 obtained from cameras and/or other location sensors may be key in identifying location for either learning new locations that will be repeated, or confirming location on a known track or geographical area (e.g., based on a map). The location information 202 can therefore be used to classify current or future driving segments. The classification can sometimes be entirely geography-based (i.e., based on map location and correspondence to known locations that are already classified). However, in other cases, the status information 200 may be used to facilitate classifying a segment based on the speeds and accelerations that are experienced for the corresponding location. The location information may then just confirm revisiting the same location that was otherwise classified based on actually experienced parameters at the location. Thus, segment classification can be either experiential (based on measured parameters) or location based.

In an example embodiment, as noted above, the operator/driver may provide user input 300 to modify the algorithms, or provide information that may be used to weight various variables that may be used in each algorithm. In this regard, for example, the control algorithms described above may each have baseline settings that may correspond to the strategies and balance considerations described above. However, the operator/driver may modify the strategies or replace strategies with other strategies according to the preferences of the operator/driver. In some cases, the memory 220 may store a plurality of algorithms with corresponding baseline strategies. The memory 220 may also store different strategies that the operator/driver may parse through to select strategies of interest and pair such strategies with respective control algorithms for each segment classification. By this method, the operator/driver may tailor the vehicle response to his/her own preferences by dictating what strategies are to be used in each segment rather than using the baseline strategies that are otherwise predefined for each segment. Instead of wholesale changes to strategies, the operator/driver may also or alternatively modify curves, offsets, values, parameters, and/or the like within strategies to fine tune the strategies.

Each algorithm may set different target positions or values for the aerodynamic device 230 based on a set of calculations or determinations intended to optimize parameters associated with the situation in which the vehicle 110 is or will find itself soon. In some cases, the algorithms may include tables of values or positions for the aerodynamic device 230, where the tables are entered using specific vehicle parameters (e.g., speed, brake pressure, etc.). Various other vehicle parameters may be entry values into such tables or may be weighting factors, or modifiers to either the table entry values or the resulting values or positions of the aerodynamic device 230. For example, ride height, yaw rate, tire age, vehicle weight, and/or the like may be modifiers in the manner described above. Calculations may also consider various vehicle status conditions (e.g., weight, weight distribution, passengers, loading, fuel status, tire condition, etc.) and weather conditions (e.g., ambient external vehicle temperature, wet roads, icy roads, etc.) to tailor handling to the conditions of the road surface at any given time.

In an example embodiment, the control algorithms may include iterative strategies for achieving target setting in real time. However, some examples embodiments may further employ the ability to improve the algorithm performance over time as well. In this regard, for example, the controller 140 may employ machine learning to adaptively improve, particularly in situations where prior data is available for the same location or situation.

Figure 4:
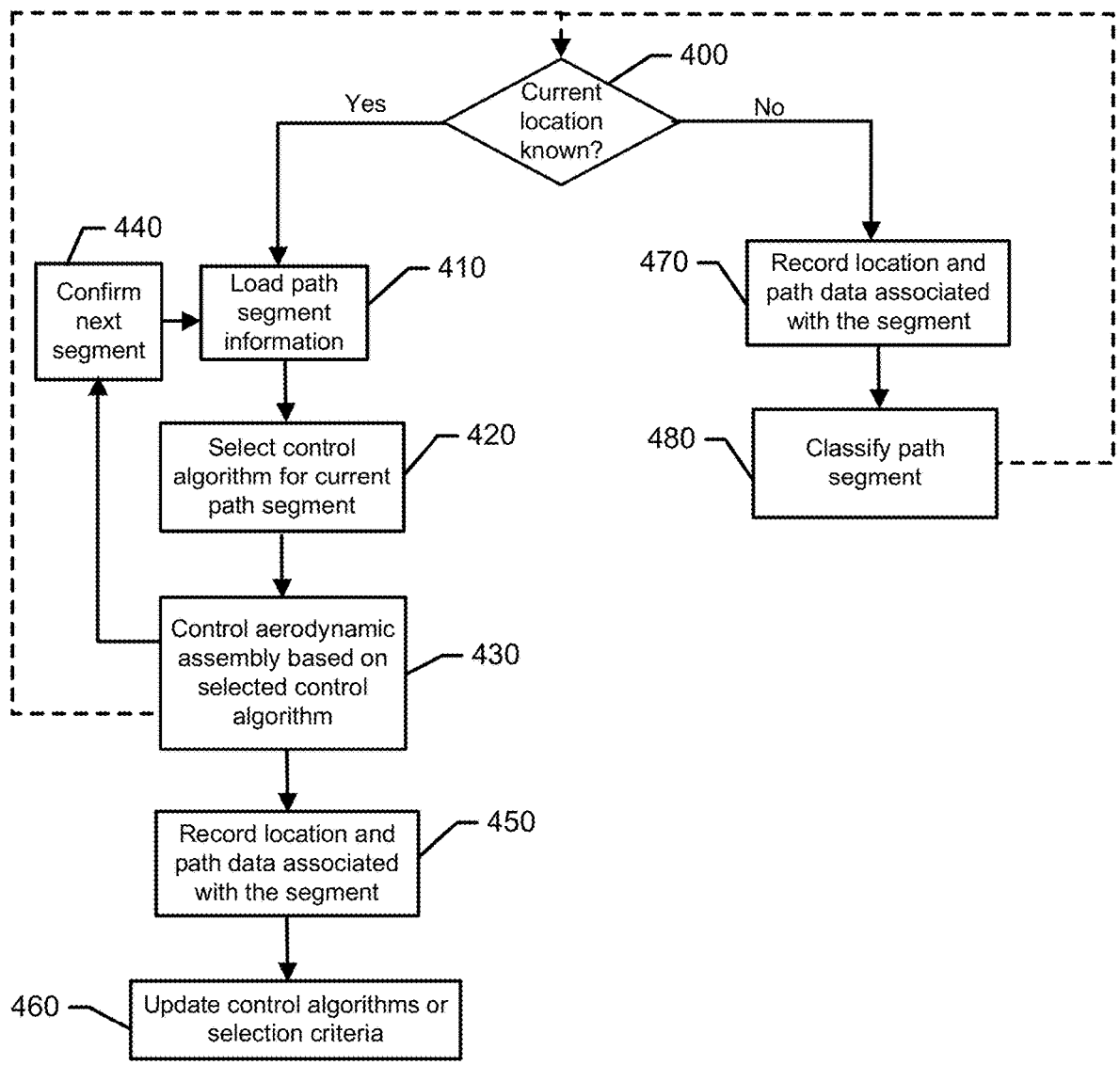
FIG. 4 illustrates a block diagram of a method of providing vehicle stability control to a vehicle having an aerodynamic device assembly disposed on the vehicle in accordance with an example embodiment.

FIG. 4 illustrate a control flow diagram for adaptive algorithm improvement in accordance with an example embodiment. In this regard, the controller 140 may determine whether a current location of the vehicle corresponds to a known location at operation 400. To accomplish such determination, the controller 140 may compare the current location of the vehicle to stored prior locations, or a database of known locations (e.g., due to preloaded maps, racetrack information, or the like). If the current location is known, the controller 140 may then load path segment information for the current location at operation 410. In some cases, operation 410 may further include sequentially loading additional path segment information for a series of path segments that extend from the current location as well. The path segments may be loaded either as reached, or immediately prior to reaching each respective segment. This effectively gives the controller 140 an understanding of the best strategy to employ for control of aerodynamic devices for the current segment (and future segments), and a control algorithm for the current path segment may then be selected at operation 420. The aerodynamic device assembly 120 may then be controlled by the controller 140 based on the selected control algorithm at operation 430. In some cases, a loop may be formed including confirming a next segment at operation 440 prior to returning to operation 410, or simply returning to operation 400.

As noted above, the control of the aerodynamic device assembly 120 may include table entry and modifications that are based on the strategy selected, and the real time driving parameters encountered during traversal of the path segment. In some embodiments, the controller 140 may have a target understeer or oversteer value for a turn, and the control algorithm may operate to facilitate reaching the target by reducing error between current understeer or oversteer values and the target values. The aggressiveness with which the error between target and actual values is reduced may be one of the factors that differentiates respective different control algorithms. In other words, the error between target and actual values may have different closure rates in which higher rates of closure correspond to more aggressive error reduction and lower rates of closure correspond to less aggressive error reduction.

Meanwhile, during performance of the operation 430, all data associated with traversal of the path segment may be recorded in association with the path segment at operation 450. Thereafter, data associated with the same or similar segments may be compared and analyzed to determine whether to update either the control algorithms themselves (e.g., fine tuning of algorithms) or selection criteria used by the controller 140 to select control algorithms for a given path segment at operation 460. The updating may be automatic (e.g., using machine learning), or may be aided by input from the driver/operator. In this regard, for example, the selector 230 may be part of a user interface that enables the driver/operator to make adjustments to control algorithms or parameters/variables associated therewith as described above.

If instead the current location was not known as a result of operation 400, then all data associated with traversal of the path segment may be recorded in association with the path segment at operation 470. Operation 470 effectively takes a previously unknown path segment and makes it a known path segment. Data regarding the vehicle's performance over the path segment and data regarding the path segment itself may then be analyzed to classify the path segment (e.g., as a high speed, low speed, or mid speed corner, as a straightaway, or any other suitable path segment classifications) at operation 480. After operation 480, the corresponding data for the path segment is available for comparison and usage the next time the path segment is encountered (or a similar path segment is encountered).

Figure 5:
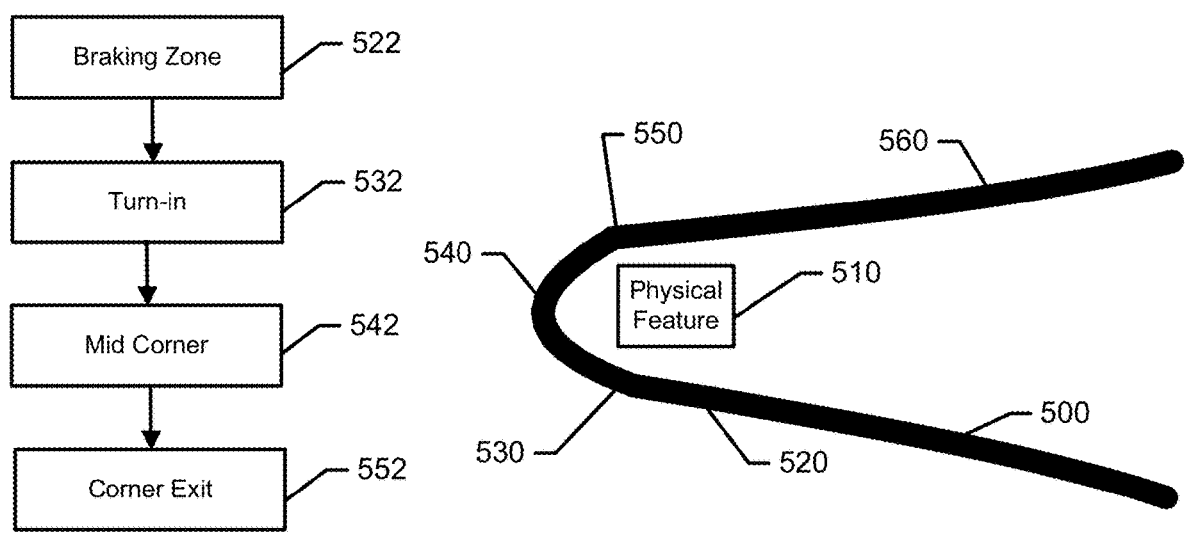
FIG. 5 illustrates sub-segments and phases applicable to each sub-segment in accordance with an example embodiment.

In some embodiments, path segments may further include sub-segments that may have respective different strategies (or sub-strategies) associated therewith for each respective control algorithm. FIG. 5 illustrates one example. In this regard, FIG. 5 illustrates a section of roadway (or track) that includes a significant turn. The vehicle may approach the turn on a straightaway path segment 500 and the straightaway algorithm 340 may be employed in this path segment. However, either via GPS, or via camera usage, the vehicle may determine that the corner is being approached, and a control algorithm change (and corresponding control strategy change) is appropriate. In this case, a physical feature 510 (e.g., a tree or other object that is distinct) may be detected by the camera to help determine location on the track or roadway, and that a corner associated with the turn mentioned above is being approached.

The turn may be of sufficient magnitude to qualify the turn as a low speed turn. Thus, upon approaching the turn, and recognizing the same, the low speed corner algorithm 310 may be selected. However, as noted above, the low speed corner algorithm 310 may include sub-strategies or algorithms that are employed based on where the vehicle is within the changing phases of making the turn. In this regard, for example, a braking zone 520 may exist at the end of the straightaway path segment 500 to allow the vehicle time to slow down before reaching turn-in zone 530, where the handwheel is turned to begin turning the vehicle. In the braking zone 520, a braking zone strategy 522 may be employed to position the aerodynamic device 230 to provide forward balance to add vertical loading and increase front tire performance envelope. Over time, positions of the aerodynamic device 230, and corresponding performance parameters may be recorded and modified slightly to (again via machine learning) optimize performance in this (and similar) sub-segments.

When the turn-in zone 530 is reached, a turn-in strategy 532 may be employed to continue to position the aerodynamic device 230 to provide forward balance to increase front tire performance envelope and provide better turn-in response. Thereafter, in the mid corner zone 540, a mid corner strategy 542 may be employed to position the aerodynamic device 230 to balance stability and maximum lateral acceleration. Finally, when corner exit zone 550 is reached, a corner exit strategy 552 may be employed to position the aerodynamic device 230 to provide rearward aerodynamic balance as the rear tire load is increased due to longitudinal acceleration before exiting the turn entirely and returning to the straightaway algorithm 340 in straightaway path segment 560.

Based on the descriptions above, it should be appreciated that positioning of an aerodynamic device may be intelligently managed based on applying different selectable control algorithms for different classifications of road segment. The road segment the vehicle is on or approaching may therefore be determined (e.g., via GPS, cameras, and/or the like) to either classify the segment (if it is being traversed for a first time) or recognize an already classified segment. Once classified, selection may be enabled for a strategy-specific control algorithm for traversing each type of segment. The selected control algorithm positions the aerodynamic device, and various parameters are recorded that effectively measure vehicle performance over the segment. This stored data (which is location specific or segment type specific) can then be analyzed to improve performance (e.g., efficiency, lap time, etc.) to try to achieve optimal aerodynamic efficiency and/or balance for a given segment (or similar segment). Moreover, machine learning may be applied to compare lap times or performance at the same location across different traversals to determine potential better balance or efficiency results that may be achieved with different aerodynamic device positions. Over multiple traversals, fine tuning may be accomplished.

Example embodiments may use input data from vehicle sensors, which may include status information such as sound information, moisture data, ride height, etc. or vehicle performance data such as steering angle, vehicle speed, brake pressure, wheel speed, accelerometer data, etc. The input data may be processed, and a machine learning algorithm may be employed to determine ideal or at least improved aerodynamic efficiency and balance to optimize lap time and drivability on track, and maximize performance on-road. As noted above, the outputs of example embodiments may be tuned for specific corners or segments of known locations or tracks. Outputs may also be optimized to reduce drag in non-grip limited conditions, or may be adjusted for driver preference (tight car, loose car, etc.). Example embodiments may use outputs to optimize handling for varying track and weather conditions, and for varying vehicle conditions (e.g., weight and weight distribution, full and empty fuel, tire state, passenger weight or loading, etc.).

Accordingly, an aerodynamics control system for a vehicle may be provided. The aerodynamics control system may include a repositionable aerodynamic device disposed at a portion of the vehicle, a controller operably coupled to components and/or sensors of the vehicle to receive information including vehicle performance data and position information for the aerodynamic device, and a vehicle location sensor determining location information for the vehicle. The controller stores the vehicle performance data and the position information in association with the location information for each of a plurality of locations. Responsive to detecting an approach of the vehicle to one of the locations, the controller provides a control instruction to position the aerodynamic device based on recorded vehicle performance data and recorded position information associated with the one of the locations.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the location may be a path segment, and the controller may determine the control instruction based on a selected one of a plurality of control algorithms executable by the controller. The selected one of the plurality of control algorithms may be selected based on a classification of the path segment. In an example embodiment, each of the plurality of control algorithms may include instructions defining a strategy for positioning the aerodynamic device for a particular type of path segment with which respective ones of the plurality of control algorithms are associated. In some cases, the types of path segment may include a straightaway and one or more corner types classified by a speed at which a corner is traversed by the vehicle. In an example embodiment, at least one of the types of path segment includes sub-segments defining phases for entering into, traversing and exiting out of the corner, and the instructions include a balance strategy for positioning the aerodynamic device in each of the phases. In some cases, the controller may employ machine learning to modify the control algorithms based on the vehicle performance data and the position information for the aerodynamic device after each subsequent traversal of the one of the locations. In an example embodiment, the system includes a camera to provide visual information to classify the path segment. In some cases, the classification of the path segment may be performed based on a comparison of the location information to previously traversed locations for which the recorded vehicle performance data and the recorded position information are stored. In an example embodiment, the classification of the path segment may be performed based on experiential data from a prior traversal of the path segment. In some cases, the classification of the path segment may be performed based on a combination of the location information and experiential data from a prior traversal of the path segment. In an example embodiment, the control algorithm may be modifiable based on user input to define vehicle performance preferences. In some cases, selection criteria for selecting the control algorithm may be modifiable based on user preferences. In an example embodiment, the control algorithm may be modifiable based on vehicle weight, weight distribution or weather conditions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An aerodynamics control system for a vehicle, the system comprising:
   a repositionable aerodynamic device disposed at a portion of the vehicle;
   a controller operably coupled to components or sensors of the vehicle to receive information including vehicle performance data and position information for the aerodynamic device; and
   a vehicle location sensor determining location information for the vehicle,
   wherein the controller stores the vehicle performance data and the position information in association with the location information for each of a plurality of locations,
   wherein, responsive to detecting an approach of the vehicle to one of the locations, the controller provides a control instruction automatically that dynamically repositions the aerodynamic device based on recorded vehicle performance data and recorded position information associated with the one of the locations,
   wherein the controller determines and executes the control instruction based on a selected one of a plurality of control algorithms run by the controller simultaneously,
   wherein the selected one of the plurality of control algorithms is selected as an optimal one of the plurality of control algorithms being run simultaneously to deliver an optimal control instruction based on a classification of a path segment, and wherein the classification of the path segment is performed in real-time using present vehicle status information, wherein each of the plurality of control algorithms includes instructions to control positioning the aerodynamic device for a particular type of path segment with which respective ones of the plurality of control algorithms are associated, and wherein the types of path segment include a straightaway and a plurality of corner types classified by a speed at which a corner is traversed by the vehicle.

2. The system of claim 1, wherein at least one of the types of path segment further comprises sub-segments defining phases for entering into, traversing and exiting out of the corner, and wherein the instructions comprise a balance strategy for positioning the aerodynamic device in each of the phases.

3. The system of claim 1, wherein the controller employs machine learning to modify the control algorithms based on the vehicle performance data and the position information for the aerodynamic device after each subsequent traversal of the one of the locations.

4. The system of claim 1, wherein the system comprises a camera to provide visual information to classify the path segment.

5. The system of claim 1, wherein the classification of the path segment is performed based on a comparison of the location information to previously traversed locations for which the recorded vehicle performance data and the recorded position information are stored.

6. The system of claim 1, wherein the classification of the path segment is performed based on experiential data from a prior traversal of the path segment.

7. The system of claim 1, wherein the classification of the path segment is performed based on a combination of the location information and experiential data from a prior traversal of the path segment.

8. The system of claim 1, wherein the control algorithm is modifiable based on user input to define vehicle performance preferences.

9. The system of claim 1, wherein selection criteria for selecting the control algorithm is modifiable based on user preferences.

10. The system of claim 1, wherein the control algorithm is modifiable based on vehicle weight, weight distribution or weather conditions.

11. A method of providing vehicle stability control to a vehicle having an aerodynamic device disposed on the vehicle, the method comprising:
receiving status information and location information from components or a sensor network of the vehicle;
determining whether the location information is a known location;
recording the location information and status information as path data for a path segment corresponding to the location information, and classifying the path segment in response to the location information not being known; and
controlling the aerodynamic device automatically based on a selected control algorithm in response to the location information being known,
wherein the selected control algorithm is selected based on a classification of the path segment,
wherein the selected control algorithm defines positions of the aerodynamic device and measures error based on the positions of the aerodynamic device to drive the error to a minimum value, and
wherein the classification of the path segment is performed in real-time exclusively using present vehicle status information obtained at the vehicle in real-time,
wherein each of the plurality of control algorithms includes instructions to control positioning the aerodynamic device for a particular type of path segment with which respective ones of the plurality of control algorithms are associated, and
wherein the types of path segment include a straightaway and a plurality of corner types classified by a speed at which a corner is traversed by the vehicle.

12. The method of claim 11, wherein classifying the path segment is performed based on the location information or experiential data from a prior traversal of the path segment.

13. The method of claim 11, wherein classifying the path segment is performed based on a combination of the location information and experiential data from a prior traversal of the path segment.

14. The method of claim 11, wherein determining whether the location information is known comprises comparing the location information to previously traversed locations for which the status information was recorded.

15. The method of claim 11, wherein the selected control algorithm is modifiable based on user input to define vehicle performance preferences.

16. The method of claim 11, wherein selection criteria for selecting the selected control algorithm are modifiable based on user preferences.

17. The method of claim 11, wherein the control algorithm is modifiable based on vehicle weight, weight distribution or weather conditions.

18. An aerodynamics control system for a vehicle, the system comprising:
a repositionable aerodynamic device disposed at a portion of the vehicle;
a controller operably coupled to components or sensors of the vehicle to receive information including vehicle performance data and position information for the aerodynamic device; and
a vehicle location sensor determining location information for the vehicle,
wherein the controller stores the vehicle performance data and the position information in association with the location information for each of a plurality of locations,
wherein, responsive to detecting an approach of the vehicle to one of the locations, the controller provides a control instruction automatically that dynamically repositions the aerodynamic device based on recorded vehicle performance data and recorded position information associated with the one of the locations,
wherein the controller determines the control instruction based on a selected one of a plurality of control algorithms executed by the controller,
wherein the selected one of the plurality of control algorithms is based on a classification of a path segment, and
wherein each of the plurality of control algorithms includes instructions to control positioning of the aerodynamic device for a particular type of the path segment with which respective ones of the plurality of control algorithms are associated, wherein the positioning of the aerodynamic device is controlled to adjust aerodynamic balance, downforce, or drag based on the classification of the path segment, wherein the positioning of the aerodynamic device is controlled to increase downforce based on the classification of the path segment being a corner traversal, and wherein the classification of the path segment is performed in real-time exclusively using present vehicle status information obtained at the vehicle in real-time.

* * * * *